J. H. MANNING.
STEAM TRAP.
APPLICATION FILED MAR. 10, 1911.
1,114,162.
Patented Oct. 20, 1914.
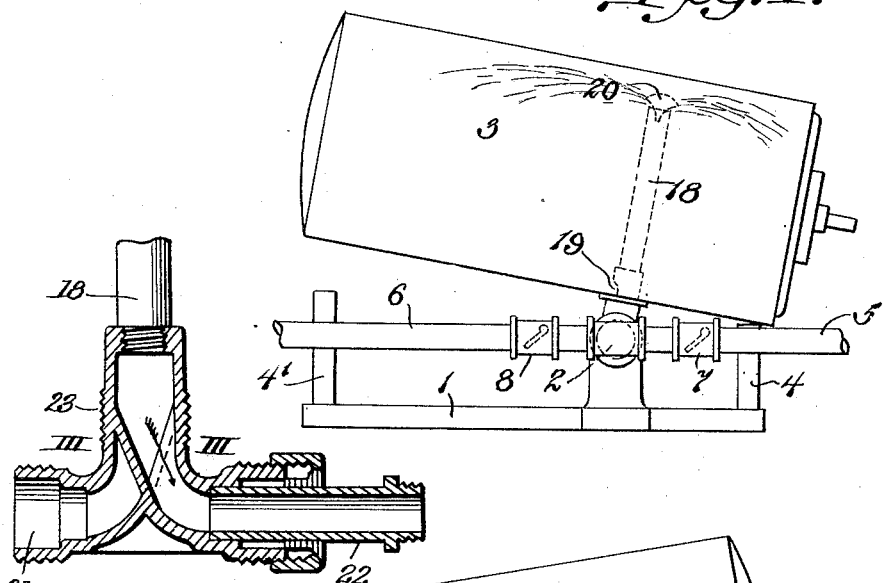
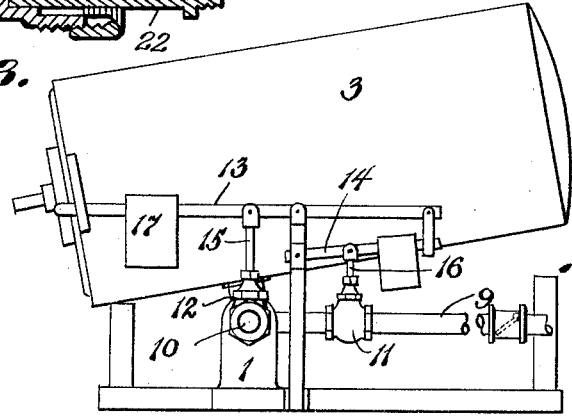
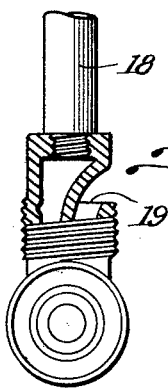
WITNESSES:
INVENTOR

UNITED STATES PATENT OFFICE.

JOHN H. MANNING, OF NEW YORK, N. Y., ASSIGNOR TO CRANE COMPANY, OF CHICAGO, ILLINOIS, A CORPORATION OF ILLINOIS.

STEAM-TRAP.

1,114,162. Specification of Letters Patent. Patented Oct. 20, 1914.

Application filed March 10, 1911. Serial No. 613,599.

*To all whom it may concern:*

Be it known that I, JOHN H. MANNING, a citizen of the United States, residing at New York, in the county of Kings and State of New York, have invented certain new and useful Improvements in Steam-Traps, of which the following is a specification.

The invention relates in general to steam traps and operating means therefor, and it has for its primary objects; the provision of an improved trap for draining heating systems of condensation, air and exhaust steam, adapted to secure positive and rapid circulation in the system; and the provision of improved mechanism within the trap adapted to create a vacuum by condensing the steam therein and thereby draw off the condensation and exhaust pressure from the system. These and such other objects as may hereinafter appear or are incidental to my invention, I attain by means of a construction illustrated in preferred form in the accompanying drawings, wherein—

Figure 1 is an elevation of one side of a steam trap embodying my invention,

Figure 2 is an elevation of the other side of the trap.

Figure 3 is a section through the T of the trunnion constituting the axis of the trap.

Figure 4 is another view of the T on the line III—III in Figure 3.

In general my invention resides in the application of a cold water spray within the trap body in order to secure a vacuum thereby condensing the steam contained in the trap body. This vacuum draws or pulls the condensation in the system into the trap from whence it is discharged to the boiler or elsewhere.

For the purpose of illustration I have shown my invention applied to a return trap of the usual character. The trap comprises the frame work 1, in which is mounted the trunnion 2 carrying the tank of the trap 3. The movement of the tank is limited by the straps 4 and 4' secured to the frame work 1. Referring to Figure 1 it will be seen that an inlet pipe 5, which is the condensation and the exhaust steam return pipe of the system leads into the trunnion 2, which is of the usual hollow construction. The pipe 6 leading from the trunnion is the discharge pipe of the trap and leads to the boiler or elsewhere. Swing check valves 7 and 8 are provided for the pipes 5 and 6 respectively.

Referring to Figure 2, 9 is a cold water supply pipe which opens into the other side of the trunnion 2, and 10 is a live steam inlet into the trunnion. The cold water supply pipe 9 is provided with a valve 11 for controlling the flow of water, and the live steam inlet 10 is controlled by the valve 12. These two valves are operated by the tilting of the trap by means of the levers 13 and 14 and the stems 15 and 16, so arranged that when the live steam inlet valve is open the cold water supply valve is closed and when the cold water supply valve is open the steam inlet valve is closed. The lever 13 carries the counterbalance weight 17. The trunnion 2, the axis of the movement of the tank, has two separate and independent chambers 21 and 22, these two chambers meeting in a divided T 23 which projects slightly into the tank. Each division of the T therefore communicates with one of the two chambers 21 and 22 and thus provides an unobstructed passage from each of the chambers into the tank as an opening or cut-away portion 19 is provided in one part of the projecting T which communicates with the chamber 21 and the chamber 22 leads through the other part of the projecting T to the pipe 18. The pipe 18 is provided with the nozzle 20, and the cold water entering from the supply pipe 5 is discharged from the nozzle in the form of a spray, as indicated in dotted lines in Figure 1.

The operation of the device is as follows, assuming the parts to be in position shown in the Figures 1 and 2, which is the filling position. In this position the tank 3 contains a portion of the steam used in expelling the liquid condensation from the tank through the opening 19 and discharge pipe 6. This live steam inlet valve 12 is closed and the cold water supply valve 11 is open, permitting cold water to enter the pipe 18 from which it is discharged in the form of a spray. This spray condenses the steam remaining in the tank, and thus creates a vacuum, which draws the liquid condensation, air and exhaust steam from the return pipe 5 of the system, into the tank through the opening 19 the swing check valve 8 being normally held closed by the vacuum. The water supply valve 11 remains open until the weight of the condensation overcomes the balance weight 17 and the trap tilts. This closes the valve 11 and opens the live steam inlet valve 12, and the live steam passes into the tank through the trunnion 2 and the pipe 18, and drives or permits the condensation to flow through the opening 19 in the trunnion to the discharge pipe 6, the check valve 7 in the liquid inlet return pipe 5 being normally held closed by the steam pressure. When the tank is emptied it tilts back to filling position, closing the valve 12 and opening the cold water supply valve 11, when the steam remaining in the trap is condensed by the cold water as above stated.

The steam remaining in the tank after it has been emptied of condensation, reduces very rapidly in pressure, thus permitting a flow of the cold water from the supply pipe 9 into the tank, but in case the steam pressure within the tank is greater than the pressure in the cold water supply pipe 9, which would prevent the flow of cold water into the tank, a pump may be placed in the supply pipe 9 to force the water into the tank or a relief valve mechanism provided to reduce the pressure in the tank. Under ordinary conditions, however, the pressure should reduce with sufficient rapidity to permit the cold water to flow into the tank.

The device is simple and effective and secures a positive, even and rapid circulation in the system, as practically a constant vacuum is maintained during the intervals between the tilting movements of the tank. It will be obvious that the invention may be applied to traps of different characters than the one illustrated, and that it may be used in drawing water from a hot well to supply a boiler and similar uses. Other advantages will occur to those familiar with the art.

Having thus described my invention and illustrated its use what I claim as new and desire to secure by Letters Patent is the following:—

1. A steam trap comprising in combination a frame, a hollow trunnion mounted on the frame, a tilting tank supported on the trunnion, a liquid return pipe and a liquid discharge pipe connected to one side of the trunnion, a live steam pipe and a cold water supply pipe connected to the other side of the trunnion, a check valve in the steam pipe, a valve in the cold water supply pipe, and operative connections for said valves whereby the tilting of the tank in one direction opens the steam valve and closes the cold water valve and in the other direction closes the steam valve and opens the cold water valve, the said trunnion opening into the tank from the liquid inlet and discharge side and having a hollow projection extending into the tank forming a passage for alternately conveying steam and cold water into the tank from the other side as the tank tilts.

2. A steam trap comprising in combination a frame, a hollow trunnion mounted on the frame, a tilting tank supported on the trunnion, a liquid return pipe and a liquid discharge pipe connected to one side of the trunnion, a live steam pipe and a cold water supply pipe connected to the other side of the trunnion, a check valve in the steam pipe, a valve in the cold water supply pipe, operative connections for said valves whereby the tilting of the tank in one direction opens the steam valve and closes the cold water valve and in the other direction closes the steam valve and opens the cold water valve, the said trunnion opening into the tank from the liquid inlet and discharge side and having a hollow projection extending into the tank forming a passage for alternately conveying steam and cold water into the tank from the other side as the tank tilts, a check valve in the liquid return pipe closing when the pressure in the tank becomes greater than the pressure in said pipe, and a check valve in the liquid discharge pipe closing when the cold water condenses the steam in the tank and creates a vacuum therein.

3. A steam trap comprising in combination a frame, a hollow trunnion mounted on the frame, a tilting tank supported on the trunnion, a liquid return pipe and a liquid discharge pipe connected to one side of the trunnion, a live steam pipe and a cold water supply pipe connected to the other side of the trunnion, a check valve in the steam pipe, a valve in the cold water supply pipe, operative connections for said valves whereby the tilting of the tank in one direction opens the steam valve and closes the cold water valve and in the other direction closes the steam valve and opens the cold water valve, the said trunnion opening into the tank from the liquid inlet and discharge side and having a hollow projection extending into the tank forming a passage for alternately conveying steam and cold water into the tank from the other side as the tank tilts, a check valve in the liquid return pipe closing when the pressure in the tank becomes greater than the pressure in said pipe, a check valve in the liquid discharge pipe closing when the cold water condenses the steam in the tank and creates a vacuum therein, and a check valve in the cold water supply pipe closing when the pressure in the tank rises above that in said pipe.

4. A steam trap comprising in combination a frame, a trunnion mounted on the frame, a tilting tank supported on the trunnion, the said trunnion opening into the tank, a steam pipe and a cold water supply pipe connected to the trunnion, a liquid return pipe and a liquid discharge pipe, an outlet from the tank forming a passage for conveying water of condensation from the return pipe into the tank and from the tank to the liquid discharge pipe, a valve in the steam pipe, a valve in the cold water supply pipe, and operative connections for said valves whereby when the tank tilts in one direction the steam valve is opened and the water valve closed and when the tank tilts in the other direction the steam valve is closed and the cold water valve opened.

5. A steam trap comprising in combination a frame, a trunnion mounted on the frame, a tilting tank supported on the trunnion, the said trunnion opening into the tank, a steam pipe and a cold water supply pipe connected to the trunnion, a liquid return pipe communicating with the tank, a liquid discharge pipe communicating with the tank, a valve in the steam pipe, a valve in the cold water supply pipe, and operative connections for said valves whereby when the tank tilts in one direction the steam valve is opened and the water valve closed and when the tank tilts in the other direction the steam valve is closed and the cold water valve opened.

In testimony whereof, I have hereunto set my hand in the presence of the two subscribed witnesses.

JOHN H. MANNING.

Witnesses:
H. A. CROCKER,
A. E. FARLEY.

Copies of this patent may be obtained for five cents each, by addressing the "Commissioner of Patents. Washington, D. C."